(12) United States Patent
Kim

(10) Patent No.: US 7,189,281 B2
(45) Date of Patent: Mar. 13, 2007

(54) METHOD AND SYSTEM FOR TREATING CONTAMINANTS AND ODORS IN AIRBORNE EMISSIONS

(75) Inventor: Byung J. Kim, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 365 days.

(21) Appl. No.: 10/911,763

(22) Filed: Aug. 4, 2004

(65) Prior Publication Data

US 2006/0027099 A1    Feb. 9, 2006

(51) Int. Cl.
*B01D 53/14* (2006.01)
*C12M 1/14* (2006.01)

(52) U.S. Cl. ............................ 95/187; 96/270; 96/289; 96/298; 435/299.1; 435/298.2

(58) Field of Classification Search ............... 95/1, 95/149, 187, 197, 210, 277; 96/243, 244, 96/268, 270, 289, 298, 291; 261/83; 435/266, 435/298.1, 299.1, 298.2
See application file for complete search history.

(56) References Cited

U.S. PATENT DOCUMENTS

| | | | |
|---|---|---|---|
| 2,793,096 A | | 5/1957 | Pomeroy |
| 4,762,539 A | * | 8/1988 | Muto ............................ 96/269 |
| 4,999,302 A | | 3/1991 | Kahler et al. |
| 5,126,050 A | | 6/1992 | Irvine et al. |
| 5,413,936 A | | 5/1995 | Rupert |
| 5,430,925 A | | 7/1995 | Maclaren |
| 5,714,379 A | | 2/1998 | Phipps |
| 5,766,938 A | | 6/1998 | Hongo |
| 5,780,293 A | | 7/1998 | Seagle |
| 5,799,612 A | * | 9/1998 | Page ............................ 119/260 |
| 6,096,198 A | * | 8/2000 | Underhill ....................... 210/123 |
| 6,171,853 B1 | * | 1/2001 | Kim ............................ 435/299.1 |
| 6,403,366 B1 | | 6/2002 | Kim |
| 6,447,681 B1 | | 9/2002 | Carlberg et al. |
| 6,599,714 B1 | | 7/2003 | Ceri et al. |
| 6,617,155 B1 | * | 9/2003 | Van Toever ............... 435/297.1 |
| 6,645,374 B2 | | 11/2003 | Cote et al. |
| 2001/0002313 A1 | | 5/2001 | Vantoever |
| 2003/0022360 A1 | | 1/2003 | Ryu et al. |
| 2004/0084368 A1 | | 5/2004 | Etienne et al. |

FOREIGN PATENT DOCUMENTS

EP    1238697 A1  *  9/2002

* cited by examiner

*Primary Examiner*—Frank M. Lawrence
(74) *Attorney, Agent, or Firm*—Earl H. Baugher, Jr.

(57) ABSTRACT

A second-generation rotating biofilter employing microorganisms in a microbiological film (biofilm) "mineralizes" contaminants, such as VOCs and odoriferous contaminants. Contaminated fluid, such as air from manufacturing processes, is directed radially outward from a perforated pipe through porous foam attached to the pipe. The pipe serves as the axis upon which layers of foam suitable for supporting formation of biofilms are placed. In one embodiment, an octagonal-shaped drum incorporates eight baskets. In each basket, foam is layered outwardly from the pipe in trapezoidal-shaped layers each of approximately 3.8 cm thickness, each layer separated by air gaps of approximately 1.3 cm to prevent clogging. Seven layers in each of eight baskets comprise the octagonal drum. When the drum is sprayed on one side, water soaks the media and it is heavier on that side, thus facilitating rotation of the drum. Further, the biofilms are supplied with moisture and supplemental nutrients as needed.

51 Claims, 11 Drawing Sheets

METHOD AND SYSTEM FOR TREATING CONTAMINANTS AND ODORS IN AIRBORNE EMISSIONS

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

Odor monitoring of air emissions is not legally mandated in the United States. Rather, odor is regulated and monitored based on the number of complaints. Gas-phase biological reactors use microbial metabolic reactions to treat contaminated air. Biological treatment is effective and economical for low concentrations of contaminants in the air, especially when handling large quantities of air. The contaminants are sorbed from a gas to the water/biological fixed film, or suspended growth, where microbial attack occurs. Through oxidative or reductive reactions contaminants are converted to carbon dioxide ($CO_2$), water vapor, and organic biomass. The most common gas-phase biological reactors are biofilters, biotrickling filters, and bioscrubbers. Devinny, J. S., Deshusses, M. A., Webster, T. S., Biofiltration for Air Pollution Control, Lewis Publishers, Boca Raton, Fla. (1999).

In the gas-phase biological reactors, an optimized balance of contaminated air, nutrients, oxygen, water and microbial population improves efficiency. Alonso, C., *Modeling of VOC Degradation in Gas Streams*, Ph.D. Thesis, University of Cincinnati, (1999). Alonso, C., et al., *Mathematical Model for the Biodegradation of VOCs in Trickle Bed Biofilters*, Water Science and Technology, 39, 7 (1999): 139–146. Alonso, C. et al., *Mathematical Model and Parameter Estimation for Treatment of VOCs in Trickle Bed Biofilters, Proceedings of the $72^{nd}$ WEF Annual Conference and Exposition,* New Orleans, La. (1999). Alonso, C. et al., *Dynamic Mathematical Model for the Biodegradation of VOCs in a Biofilter-Biomass Accumulation Study,* Environmental Science and Technology, 32, 20 (1998): 3118–3123. Alonso, C. et al., *Modeling of the Biodegradation Process in a Gas Phase Bioreactor-Estimation of Intrinsic Parameters, Proceedings of the* 1998 *USC-TRG Conference on Biofiltration,* Los Angeles, Calif. (1998).

Biofilters generally pass humidified, contaminated air through a thick layer of peat moss or soil. Over time, this media compacts so that contaminated air/oxygen moves through a shortcut passage or crack, and only the microorganisms present in the passage are exposed to contaminated air. This "channeling effect" means that only a limited portion of the media is actually used. Although the media material is porous, air does not pass through the pores of compacted media.

Biofilters are not true filtration units but are systems that combine the basic processes of absorption, adsorption, desorption and degradation of gas phase contaminants. Typical biofilters employ microorganisms affixed to organic media such as compost or peat. Extensive study into the growth properties of microorganisms (e.g., bacteria) in recent years has shown that particular types of bacteria may exist in complex forms comprising layers that tenaciously adhere to surfaces. Upon adhering to a surface, these complex forms of bacteria are termed "biofilms." Generally, biofilms are comprised of sessile bacteria, this particular type of bacteria contributing to their inherent tenacity. As the contaminated air passes through the organic media, the contaminants sorb onto the biofilm and are biodegraded by the microorganisms. Biofilters usually employ water to humidify the contaminated gas stream prior to entry into the biofilter and to add nutrients for the microorganisms. If humidification proves inadequate, direct irrigation of the bed may be employed. Over time, all conventional media compacts, necessitating replacement.

A biotrickling filter uses inorganic material, such as diatomaceous earth, ceramic, or glass beads, for its packed bed. A biological fixed film grows on this bed. Water is sprayed on top of the packed bed and contaminated air is fed counter-currently or co-currently. Biotrickling filters exhibit many of the phenomena of all biofilters. However, since a biotrickling filter hosts a thriving microbial population, excessive biomass growth and clogging are common problems.

In a bioscrubber, after initial contact with contaminants, absorption occurs. The contaminants are then degraded in a separate aeration tank. Absorption of contaminants may be achieved in a packed column, a spray tower, or a bubble column.

A gas-phase bioreactor is disclosed in U.S. Pat. No. 2,793,096, De-Odoring of Gas Streams by the Use of Micro-Biological Growths, to Pomeroy, May 21, 1957. This bioreactor uses soil beds to treat odorous sewer gases. In the last ten years, more stringent environmental requirements have renewed interest in gas-phase biological reactors. The following U.S. patents are directed to improving the efficiency of gas-phase biological reactors.

U.S. Pat. No. 4,999,302, Biological Contact Gas Scrubber for Waste Gas Purification, to Kahler et al., Mar. 12, 1991, rearranges a rotating biological contactor (RBC), a typical wastewater treatment unit, and feeds contaminated air into a series of chambers containing an RBC disc set. A defect of this design permits contaminated air to short-circuit through the space between the RBC and the housing. The air in the RBC disc set remains stagnant so that all available microorganisms are not used.

U.S. Pat. No. 5,413,936, Rotary Biofilter, to Rupert, May 9, 1995, rotates a horizontal cylindrical vessel filled with biofilter media. The purpose of rotation is to break up compacted media and to collapse any fissures. Although the rotation helps to reduce the compaction and destroy cracks, there is channeling in the media, the channeling becoming more apparent over time.

U.S. Pat. No. 5,714,379, Biodegradation of Volatile Organic Contaminants from Air Using Biologically Activated Foam, to Phipps, Feb. 3, 1998, employs biologically activated foam to treat contaminated air.

U.S. Pat. No. 5,766,938, Biological Deodorizing Apparatus with Rotary Carriers, to Hongo, Jun. 16, 1998, modifies the RBC system with a perforated high-density polyethylene disc and a water-scooping device.

U.S. Pat. No. 5,780,293, System and Method for Capturing and Destroying HAP/VOC Substances Using Microbial Degradation, to Seagle, Jul. 14, 1998, uses filtering media, such as activated carbon or zeolites, in a rotating drum. It passes contaminated air through the drum after it is scrubbed in a suspended growth solution. The scrubbed air escapes mainly through the space between the wall and drum and through cracks in the media.

The channeling effect is also a problem for the biotrickling filter. Zhu and others observed dense biomass growth in a biotrickling filter and had to backwash regularly to avoid clogging. When water is sprayed and clogging starts, water forms a channel in the biotrickling filter and contaminated air follows the channeling passages. Again, in the biotrickling filter, the microorganisms outside of the channel passage have a limited chance to contact contaminated air, oxygen, nutrients, and moisture. Zhu, Xueqing, *A Fundamental Study of Biofiltration Process for VOC Removal from Waste Gas Stream*, Ph.D. thesis, University of Cincinnati (2000). Zhu, X et al., *The Influence of Liquid Flow Rates on VOC Removal in Trickle-Bed Biofilters, Proceedings of the AWMA Annual Meeting & Exhibition*, St. Louis, Mo. (1999). Zhu, Xueqing et al., *Biofilm Structure and Mass Transfer in a Gas Phase Trickle-bed Biofilter*, $1^{st}$ World Water Congress of the International Water Association, *Water Science and Technology*, Paris, France (July 2000). Zhu, X. et al., *The Effect of Liquid Phase on VOC Removal in Trickle-Bed Biofilters*, Water Science and Technology, 38, 3 (1998): 315–322.

Zhu and others found nitrate to be a better nitrogen source, but nitrate is a limiting factor when a highly biodegradable substance is treated. It was also found that gas-phase contaminated air can directly contact microorganisms without passing through the liquid layer. Zhu, X. et al., *The Influence of Liquid Flow Rates on VOC Removal in Trickle-Bed Biofilters, Proceedings of the AWMA Annual Meeting & Exhibition*, St. Louis, Mo. (1999). Rihn, M. J. et al., *The Effect of Nitrate on VOC Removal in Trickle Bed Biofilters*, Water Research, 31, 2997–3008 (1997). Zhu, X. et al., *The Effect of Nitrate on VOC Removal in Trickle Bed Biofilters*, Water Science and Technology, 34, 34 (1996): 573–581.

In order to overcome the nitrate-limiting condition, a gas-phase nitrogen source was suggested. In the bioscrubber, the chance of water drops meeting contaminated air is also limited. In order to increase the microorganisms' chance to contact contaminated air in a bioscrubber, Yu and others used a three-phase fluidized bed and found that suspended biomass and fixed film play different roles at different environmental conditions. Kim, Byung J. et al., *Treatment of Volatile Organic Compounds from Gas Streams Using a Three-Phase Circulating-Bed Biofilm Reactor*, ERDC/CERL TR-00-9, U.S. Army Corps of Engineers, Champaign, Ill. (2000). Yu, H. et al., *Contributions of Biofilm Versus Suspended Bacteria in an Aerobic Circulating Bed Biofilm Reactor*, 1st World Water Congress of the International Water Association, *Water Science and Technology*, Paris, France (July 2000). Yu, H. et al., *Gas Phase Toluene Removal by Circulating Bed Biofilm Reactor, International Specialty Conference on Biofilm Processes, International Association on Water Quality*, New York (November 1999). Yu, H. et al., *Effects of Substrate and Oxygen Limitation on Gas-phase Toluene Removal in a Three-phase Biofilm Reactor*, Water Science and Technology, (2001). As follow-on to the work of Yu, B. Sang et al. reported higher removal efficiency of smaller size carriers. Sang, B. et al., *The Trade-Offs and Effect of Carrier Size and Oxygen Loading on Gaseous Toluene Removal—Performance of a Three-phase circulating Bed Biofilm Reactor, Applied Microbiology and Biotechnology* (2003).

Dr. Byung Kim, the present inventor, used random-shaped engineered media (e.g., a flat square of polyurethane punched in the center with a circular hole and cut in half) to observe that contaminated air passed through spaces between the media. Little microorganism growth occurred inside of media pores, and only the surface of the media was actively used. Kim, Byung J. et al., *Biofiltration of Solvent Vapors from Munitions Manufacturing Operations*, CERL Technical Report 99/57, U.S. Army Corps of Engineers, Champaign, Ill. (1999).

Based on the above investigation results, Dr. Kim designed an improved closed biofilter, i.e., the first-generation rotating biofilter, for which design he obtained U.S. Pat. No. 6,403,366 B1, *Method and Apparatus for Treating Volatile Organic Compounds, Odors, and Biodegradable Aerosol/Particulates in Air Emissions*, to Kim, Jun. 11, 2002. C. Yang et al. compared single layer and multi-layered media using the above patent and reported higher efficiency of multi-layered media (i.e., with air gaps). C. Yang et al, *Comparison of Single-layer and Multi-layer Rotating Drum Biofilters for VOC Removal, Environmental Progress, AIChE* (2003). C. Yang et al also compared performances at different modes of operation. Yang, C. et al., *Removal of Volatile Organic Compounds in a Hybrid Rotating drum Biofilter, Journal of Environmental Engineering*, ASCE (2004). C. Yang, had also comprehensively evaluated the above patented biofilter at bench scale. Yang, C., Draft Ph.D. Thesis, University of Cincinnati (2004).

The above patent describes employment of a porous media of "microbial" foam that rotates in a closed reactor, improving the efficiency of gas-phase biological reactors by increasing the chances of the contaminants meeting with the oxygen, nutrients, and moisture needed for the microorganisms to work most effectively. In the first generation rotating biofilter, contaminated air is introduced to a stainless housing that contains the cylindrically shaped media system. Rotating the media with motor, chain, and sprocket is not straightforward, especially if the shaft diameter is equal to or greater than about 30 cm (1.0 ft.). Off-the-shelf chain and sprockets for such applications are not readily available commercially. In long-term operation, the sprocket and chain drive is the weakest point of the first generation rotating biofilter. Frequent replacement and repair is needed as experienced in operation of rotating biological contactors in wastewater treatment plants. Since the media is submerged in nutrient-enriched water for half of the time, there is much more water than the microorganisms require during the submerged cycle and at the beginning of the emerging cycle. Moreover, since the air stream flows from the circumference of the media to the center/shaft, airflow may force the biomass to move toward the center of the rotating biofilter.

Still, even the first-generation rotating biofilter reactor performs better than conventional gas-phase biological reactors because it overcomes channeling effects and uses the complete surface of all media pores as fully coated with a biological fixed film. The present invention improves upon the first-generation rotating biofilter to implement a second-generation open-bed biofilter with all of the benefits of the first-generation closed reactor and enhancements thereto.

DETAILED DESCRIPTION

Figure 1A:
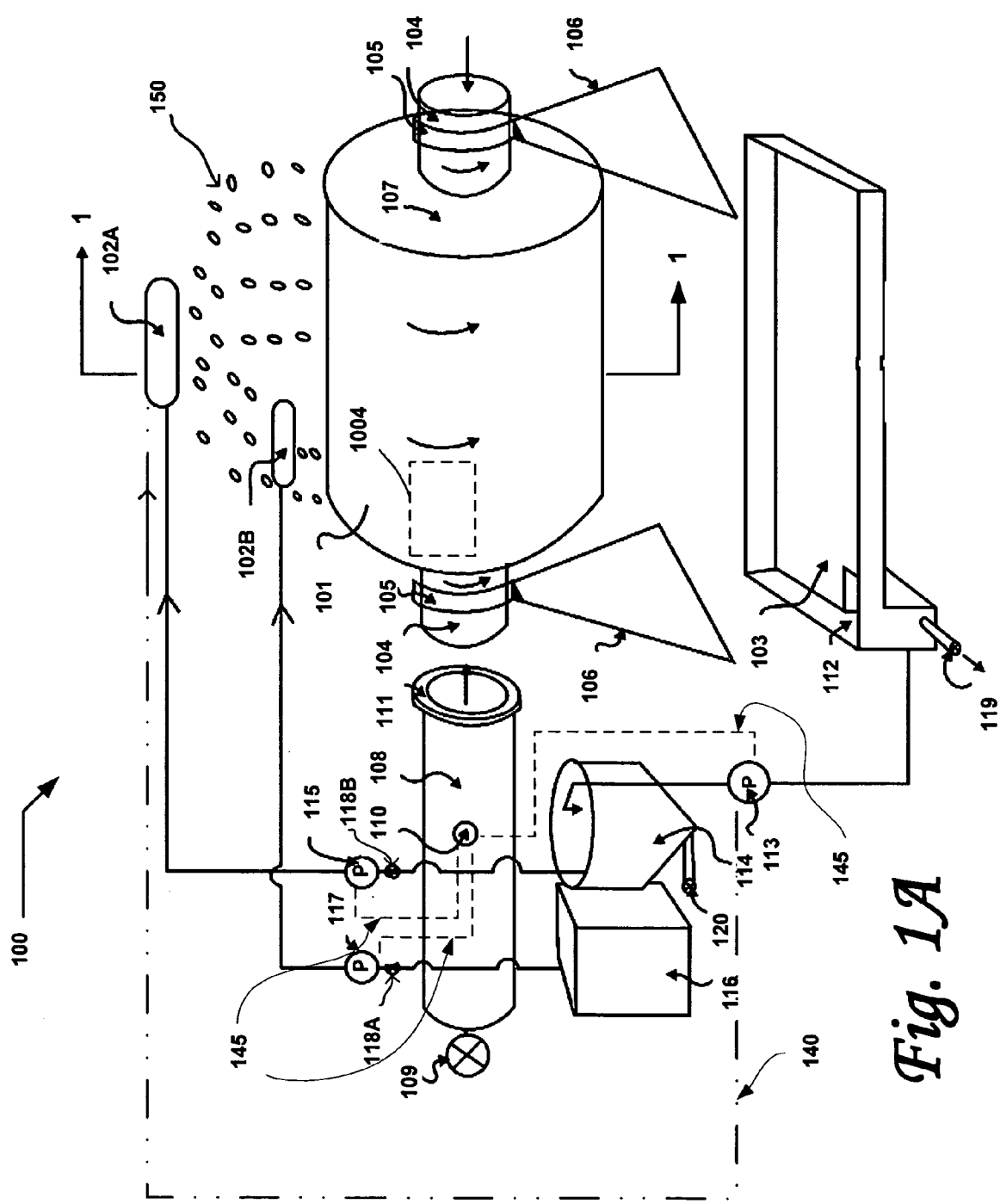
FIG. 1A depicts a general schematic descriptive of embodiments of the present invention.

In general, embodiments of the present invention comprise an apparatus that degrades contaminants in a fluid by providing: a conveyance for contaminated fluid, such as conduits or pipes for bringing contaminated air from a manufacturing process or a source odor, and injecting the fluid into media; a holder to contain the media; media, such as an open-celled foam, for cultivating and maintaining a suitable biofilm; microorganisms suitable for cultivating the biofilm, a mechanism for rotating the media, such as pumps, collection reservoir, settling tank, sprayer and "paddles" on the holder for collecting water in much the same manner as a water wheel; and an additional mechanism, such as a reservoir, pump, and sprayer for exposing the media to supplemental fluid containing nutrients suitable for maintaining the biofilm. In certain embodiments a control mechanism for optimizing operation automatically or semi-automatically may be provided.

In one embodiment of the present invention, one of the pipes may be perforated so as to distribute the contaminated fluid through the media for a pre-specified retention period. A second pipe connected "upstream" from the first pipe feeds the contaminated fluid and may further permit access to the fluid while the apparatus is in operation for purposes of testing or adjusting operating parameters. In embodiments of the present invention, the media comprises a foam, most generally an open-celled foam that may be selected from a polyurethane foam, a polyethylene foam, a polystyrene foam, or similar foams, and combinations thereof. In one embodiment, the foam is formed to accommodate a pre-specified minimum pore size in the range of about 0.5–5.0 mm (0.02–0.2 in) and distribution of said pores in the range of about 2–20 pores/cm (5–50 pores/in) of the foam in all possible dimensions, including a slice taken through the center of a section of the foam. In embodiments of the present invention, the synthetic foam is free of fire retardant and biocide and comprises a hydrophobic material or combinations of two or more hydrophobic materials, preferably with a hydrophilic surface to facilitate attachment of a biofilm.

In one embodiment of the present invention the mechanism for rotating comprises: fluid dispensers; pumps connected to the dispensers for activation thereof; fluid retention devices, such as "channels" along the long axis of a drum-like configuration containing the media holders to accumulate fluid for facilitating rotation of the media or "paddles" of a water wheel separately attached at one end of the drum-like configuration; and a fixed structure incorporating bearing surfaces both to hold a perforated pipe acting as the axis about which the drum-like configuration rotates, the fixed structure facilitating rotation of the perforated pipe with the media upon appropriate bearing surfaces installed therein.

An alternative embodiment may use just the weight of the fluid soaking into one side of media disposed about the drum-like configuration to rotate the media about the perforated pipe. In one embodiment of the present invention, the fluid dispenser is a sprayer. To control sludge buildup, an embodiment of the present invention comprises one or more settling tanks with pumps connected thereto for pumping fluid into the tanks from a recovery reservoir and out of the tanks to the fluid dispensers.

In one embodiment of the present invention, the mechanism for exposing the biofilm to supplemental fluids at least in part comprises: one or more pumps for pumping the fluid to a fluid dispenser; and one or more reservoirs of supplemental fluid connected to appropriate pumps.

In one embodiment of the present invention, the biofilter is controlled by manually observing operation and manually adjusting the operation of the components of the apparatus. This embodiment is most suitable for small batch processing over relatively short intervals of time.

In other embodiments of the present invention, the apparatus may be controlled automatically or semi-automatically with a system further comprising: appropriate sensors, such as pH sensors, thermometers, rotational speed monitors, pressure transducers, gas analyzers (e.g., hydrocarbon, hydrogen sulfide, sulfur dioxide, carbon dioxide, ammonia, oxygen, etc.), flow meters, etc.; connection pathways to the sensors, such as hard-wired electrical, pneumatic, acoustic, fiber-optic, and wireless paths; and a control system communicating with the sensors and various components (such as pumps, fluid dispensers, reservoirs, access openings, fans, etc.) via any of the various types of pathways. In one embodiment of the semi-automatic or automatic system, the control system may control at least: rotational speed of the media; the operating temperature; the pH of the contaminated fluid; the pressure of the contaminated fluid within the media; the retention time of the contaminated fluid within the media; the flow rate of the contaminated fluid into the apparatus; the pH of the nutrient solution, inlet and outlet concentrations (e.g., hydrocarbon, hydrogen sulfide, sulfur dioxide, carbon dioxide, ammonia, oxygen, etc.) and the integrity of the biofilm. The controller may comprise: a personal computer, a general purpose computer, a laptop computer, an application specific integrated circuit (ASIC), combinations of the above, and the like.

In another embodiment of the present invention, the control system may further comprise: one or more input devices, such as a key pad, keyboard, touch pad, mouse, microphone, etc.; one or more communications mechanism, such as a visual alert, an audible alert, a vibratory alert, text messaging, verbal recordings, etc. to alert to anomalous operation and one or more displays, such as CRTs, LCDs, gauges, LEDs, etc. The displays may be remote from the apparatus itself, such as in an operator's control room or even off site.

In yet another embodiment of the present invention the mechanism for exposing the biofilm to supplemental fluids at least in part comprises: one or more access ways, (such as plugged ports, caps, etc.) to the conveyance mechanisms (such as pipes, flexible conduit, etc.) for the contaminated fluids; one or more pumps; one or more reservoirs of supplemental fluid to be moved by the pumps; and, in select embodiments, one or more atomizers connected to the pumps to provide a "mist" to mix with the contaminated fluid prior to entering the treatment apparatus or to provide a mist over the rotating media.

A method for treating contaminated fluid is also provided for embodiments of the present invention. One such method comprises:

providing porous media in layered sections for attachment to a perforated conduit, such as a pipe, and arranging the sections to form a multi-sided smoothly contiguous configuration about the conduit;

providing fluid retention mechanisms, such as channels evenly spaced about the outer circumference of the configuration or a "water wheel" attached at one end of the rotating media for rotation therewith;

rotating the conduit (with the media affixed thereto) and wetting the media via flow of a non-contaminated fluid over the configuration, such that the weight of the non-contaminated fluid (e.g., either clean or nutrient-enriched water) retained in the fluid retention mechanisms facilitates rotation of the center conduit and media together;

providing at least one type of microorganisms to establish at least one biofilm on the media;

maintaining a contaminant-abating effective level of the biofilm on the media;

passing the contaminated fluid from the perforated conduit through the media such that the contaminated fluid is retained for a pre-specified retention period in the media; and catching the fluid sloughed from the configuration after wetting the media; and in select embodiments of the present invention recycling the sloughed fluid after de-canting by settling solids therein as necessary.

This method removes at least some contaminants from the contaminated fluid, removes at least some volatiles organic compounds (VOCs), if any, and at least some odor from odiferous contaminated fluid. Further, the method may supplement nutrients to the microorganisms to facilitate maintaining the biofilm. Another embodiment further comprises mixing non-contaminated fluid, e.g., clean water or a mix of clean water and nutrient-enriched water, with contaminated fluid prior to introduction of the contaminated fluid to the media.

Yet another embodiment of the method comprises providing a control system for automatic control. Another embodiment of the method further comprises integrating the control system into an emission control system of a facility.

Refer to FIG. 1A. An embodiment of the present invention provides a second-generation rotating biofilter 100 that offers better technical performance than first-generation rotating biofilters. This biofilter 100 and like embodiments effectively "mineralize" VOCs and odors. Embodiments of the present invention yield low capital and operating costs, high operating efficiencies, and the flexibility to be operated independently or in conjunction with other first or second generation systems.

Embodiments of the present invention are simple to build and inexpensive to operate and maintain. They require no drive motor, no chain and sprocket mechanism to rotate a drum 101, and no corrosion-resistant enclosure. Instead, in one embodiment of the present invention, the drum 101 may be rotated by the weight of water absorbed on the media 222 (FIG. 2) from the water flow 150.

Figure 1B:
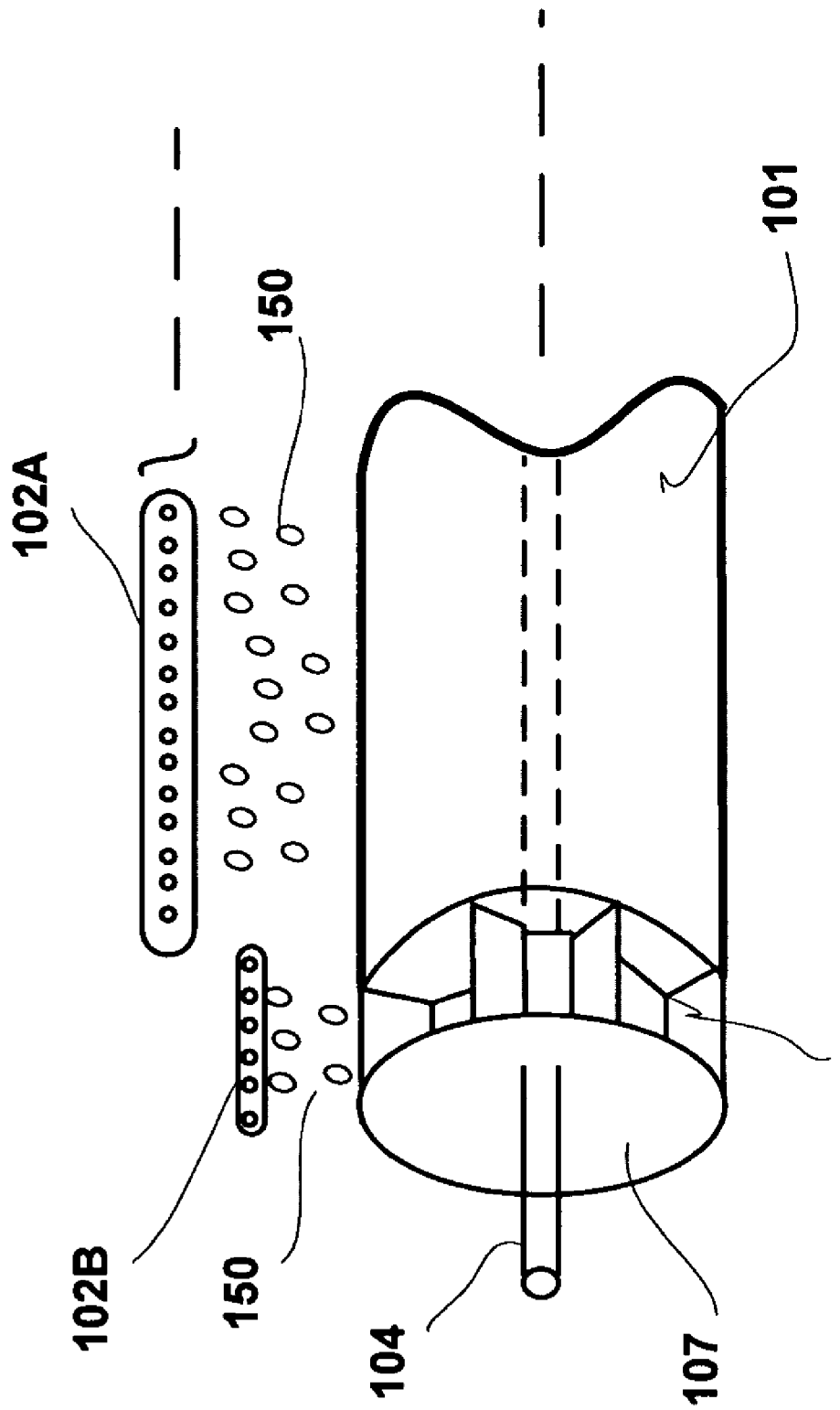
FIG. 1B depicts an alternative configuration for rotating an embodiment of the present invention.

Refer to FIG. 1B. In another embodiment of the present invention, rotation may be augmented by water flow 150 over a "paddle wheel" 130 in the same manner used in $19^{th}$ century grain mills. Added to one end of the drum 101 is a paddle wheel 130 that either provides all of the torque necessary to turn the drum 101 via water flow from the dispenser 102B or supplements the water flow from dispenser 102A to rotate the drum at a pre-specified rate.

Figure 9:
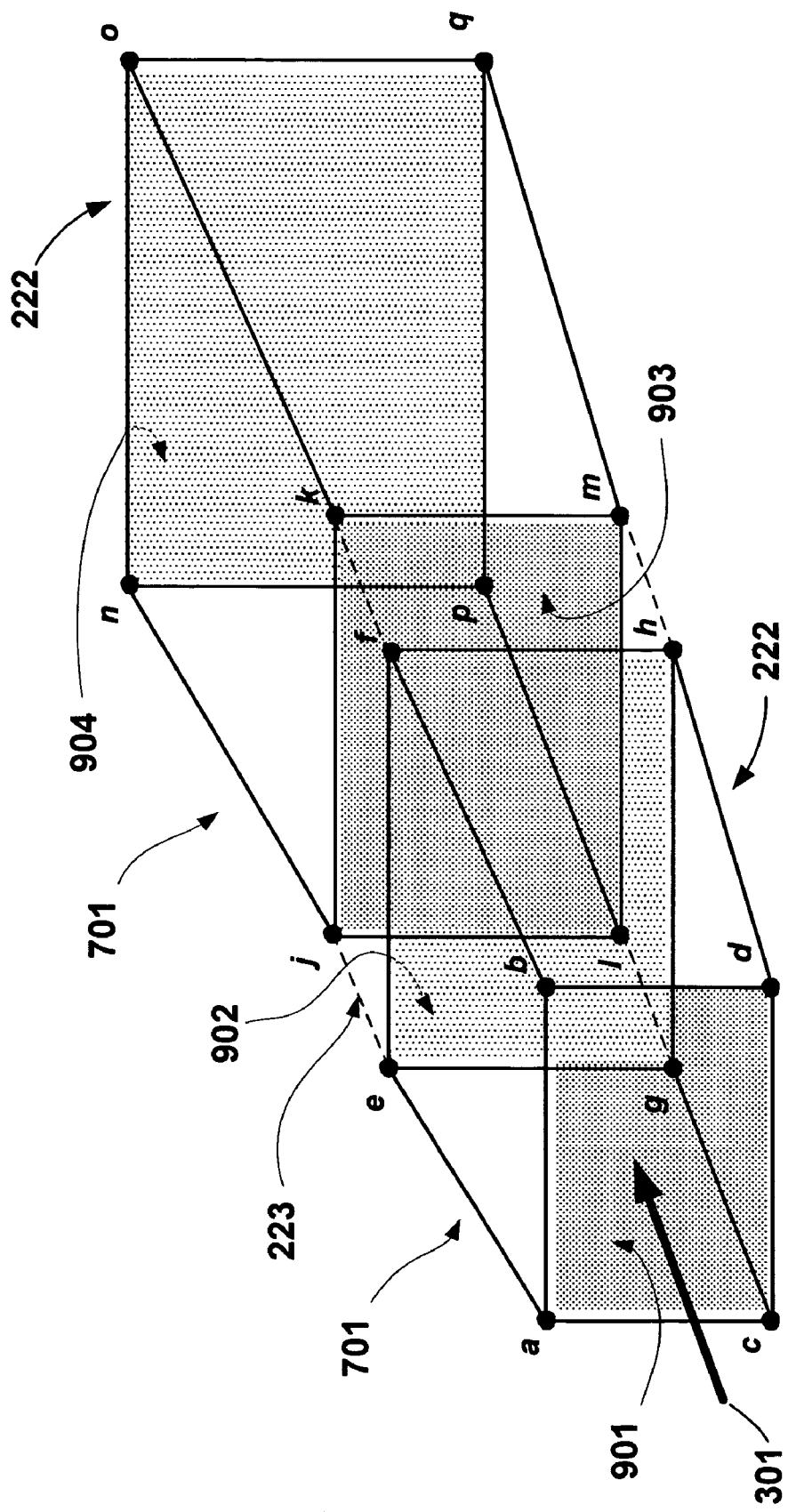
FIG. 9 is a profile of a portion of one of the eight sections of FIG. 2.

The driving mechanism of first-generation rotating systems using chains and sprockets requires more maintenance than embodiments of the present invention. The open biofilter 100 of the present invention is operationally flexible in that the amount of contaminated fluids, oxygen, nutrients, and, especially, applied moisture is controlled efficiently. In contrast with first-generation rotating biofilters, an embodiment of an open biofilter 100 of the present invention has no part of its cycle occur during submersion of the filter material 222 (FIG. 2) in liquid so that 100 percent of the media is exposed to treat contaminated fluid, e.g., contaminated air from a manufacturing process, during operation. Embodiments of the present invention achieve a high efficiency by uniform and direct distribution of contaminated fluid (e.g., air), nutrients, and oxygen through the biofilms in the entire porous volume of the media 222, i.e., biofilms formed both externally on the media surface (examples of surfaces are depicted in FIG. 9 at 901, 902, 903, 904) and internally adjacent the pores within the media volume. Finally, the design of components, notably the media cartridge 627 and empty basket 629, both as shown in FIG. 6, facilitates efficient biofilm generation.

Figure 2:
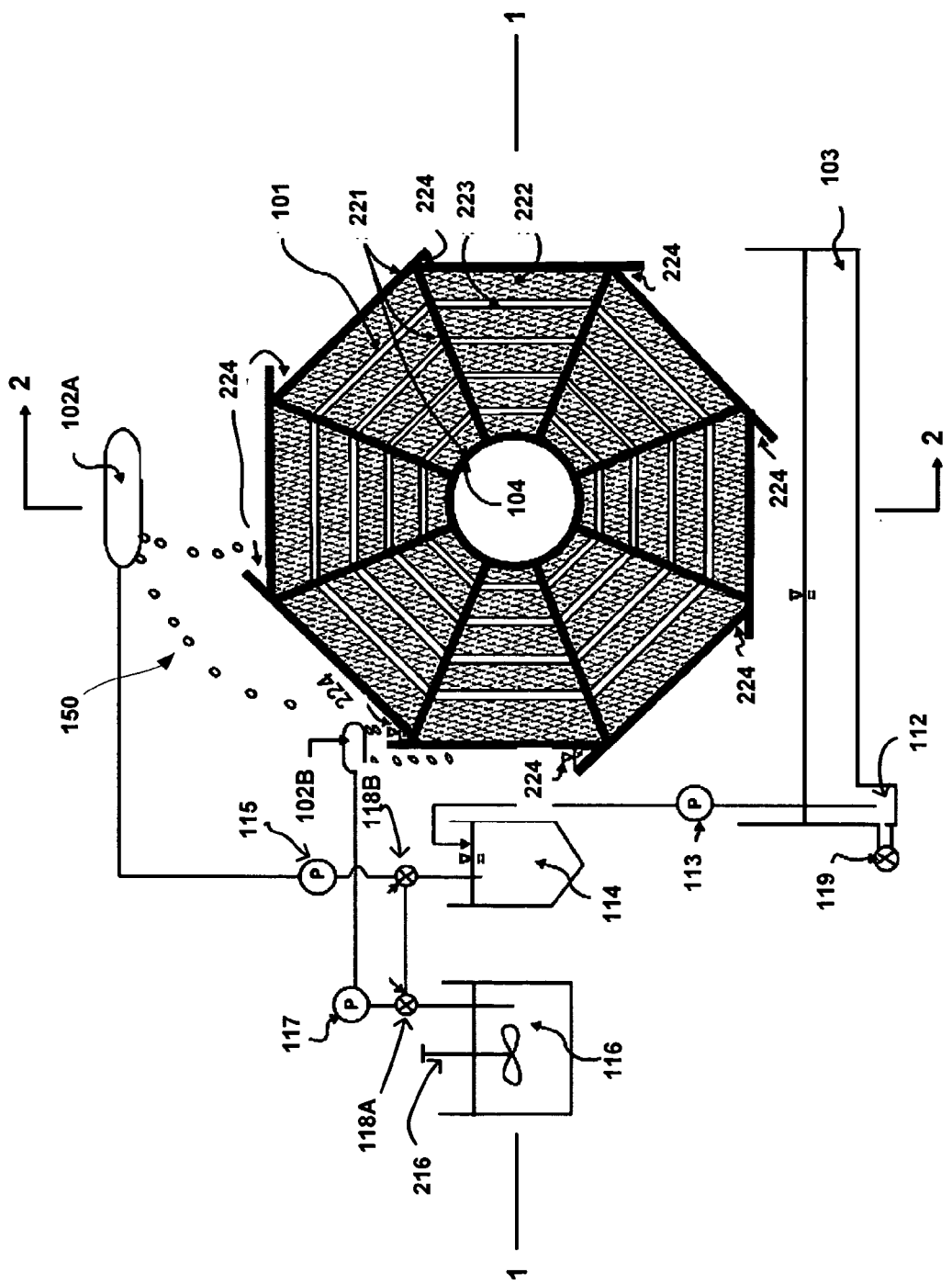
FIG. 2 represents a cross section of an embodiment of the open-bed biofilter of the present invention through 1—1 of FIG. 1A.

Refer also to FIGS. 2 and 9. The amount of water 150 added to the media 222 may be precisely controlled to optimize efficiency. Controls for an embodiment of the present invention may be operated via a small computer and comprise various sensors to detect pH, temperature, pressure, flow rate, rotational speed, etc., and feedback to various electronic and electromechanical devices for controlling such parameters as treatment efficiencies, rotational speed, nutrient addition, water re-cycling, water flow, temperature, pH, pressure, thickness of the biofilm, type of organisms to be used, etc. These control mechanisms are known in the art and may be applied with the present invention by one skilled in the art to provide an automated or semi-automated system that works in cooperation with larger pollution control systems or as an autonomous system.

Figure 3:
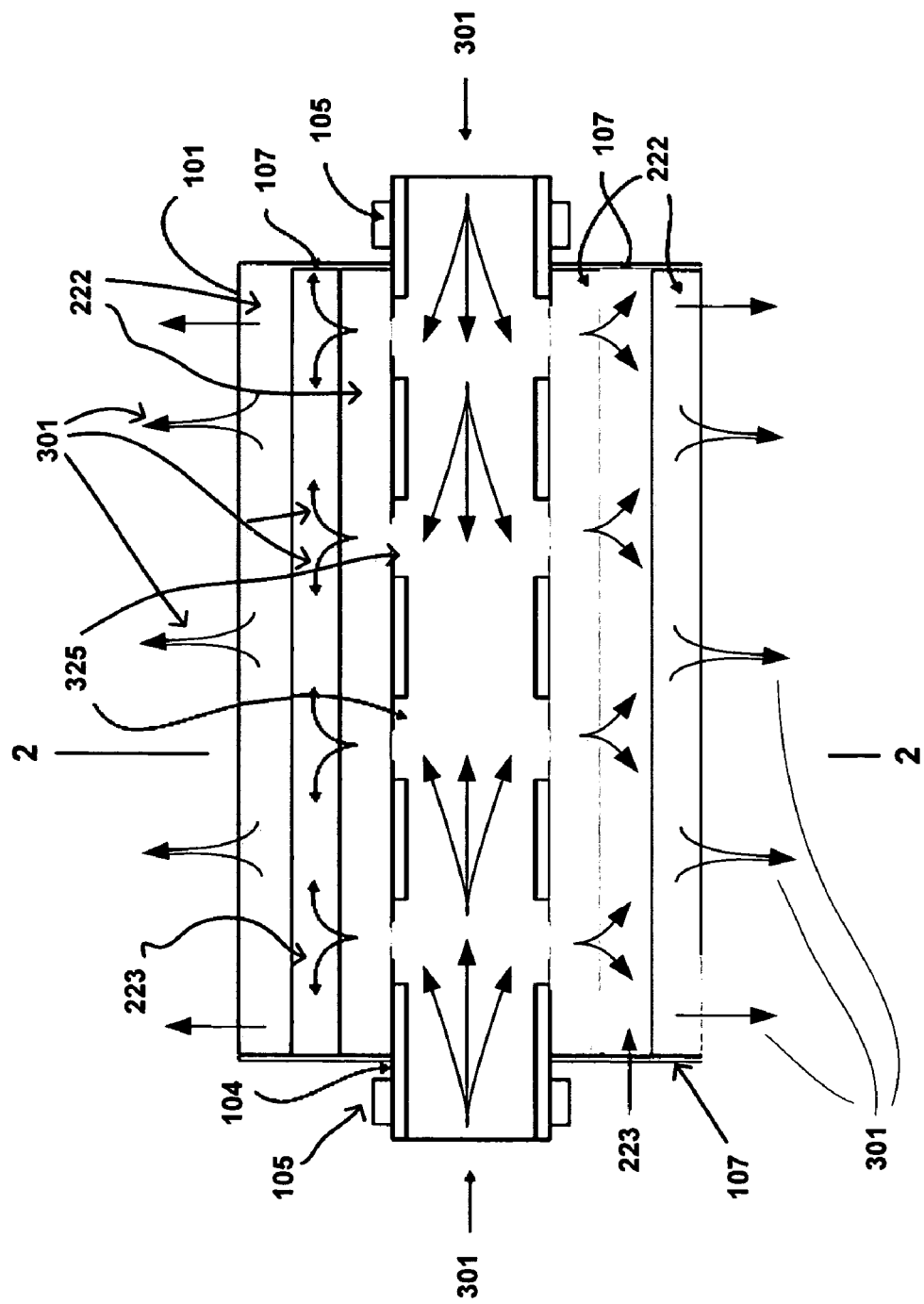
FIG. 3 shows a profile of an embodiment of the open-bed biofilter of the present invention through 2—2 of FIG. 2.

Refer to FIG. 3. Contaminated fluid 301, such as malodorous air, flows in a radial direction from the center of a fixed input shaft 108 to a rotating cylindrical shaft 104 on which media 222 is mounted to create the outer circumference of the drum 101. Foams suitable for fabricating media include any relatively open-celled synthetic foams of polyurethane, polyethylene, polystyrene and the like. The thickness of the foams may be approximately 1.0–10.0 cm (⅜ in–4 in) with a thickness of 3.8 cm (1⅛ in) employed in one embodiment of the present invention. The pore density of the foams may be in the range of 5–50 pores/in. with pore size in the range of 0.5–5.0 mm (0.02–0.2 in). In one embodiment of the present invention, temperature of the media 222 is maintained between about 15°–35° C. and humidity within the media 222 in the range of 90–100% relative humidity. Inorganic salts may be added as nutrients to include salts of K, P, N, S, Mg, and Fe. Organic material, such as carbon sources, may be added as necessary. In one embodiment of the present invention, the retention period for contaminated fluid is in the range of 15–120 seconds, with a nominal average of about 30 sec in a typical treatment scenario. Various microorganisms may be used as well known in the art, each species adapted to perform optimally under selected environmental conditions with known contaminants. Suitable species include: *Bacillus* sp., *Pseudomonas* sp., *Thiobacillus* sp., and the like, as well as mixed cultures thereof.

Figure 6:
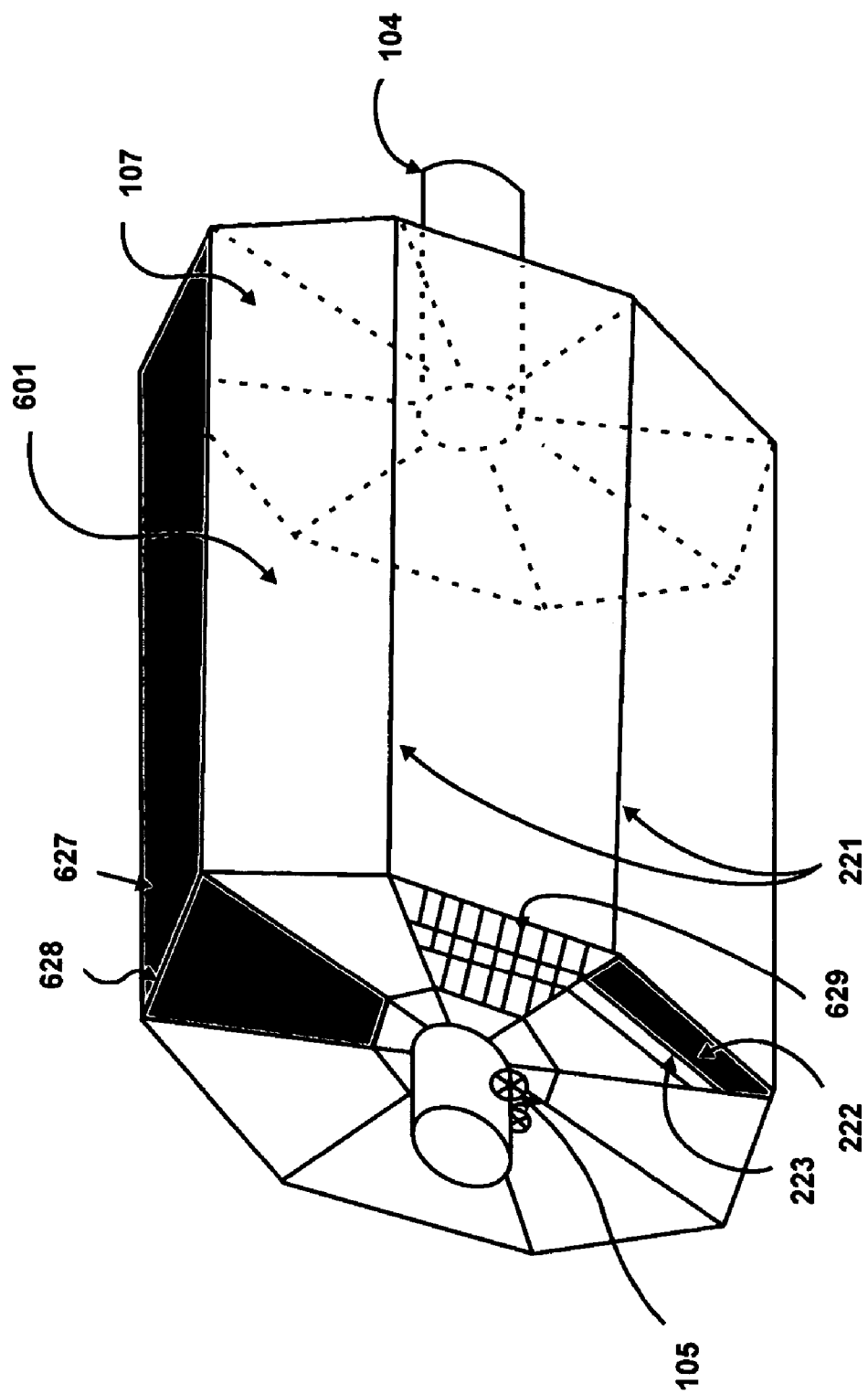
FIG. 6 illustrates particulars of a configuration of media container segments suitable for use with embodiments of the present invention.

Refer to FIGS. 1, 2 and 6. When collection of treated fluid emissions, such as treated process air, is not required, an "open" biofilter 100 embodiment of the present invention may be used for odor control. Contaminated air is fed through an inlet valve 109 in the shaft (fixed inlet conduit or pipe) 108 and passes through media 222 disposed in baskets 629 about the "open" rotating drum 101. Media is contained in individual media holders 627 disposed circumferentially about the drum 101 to collectively comprise the outer circumference of the drum 101. Treated fluid 301 (FIG. 3) is passed from the inlet pipe 108 outward in a radial direction across both the media 222 and multiple air gaps 223 separating individual "slices" of media 222 in the media holders 627 to eventually pass through the outer surface of the media holders 627, the outer surface of each holder 627 comprising a portion of the circumferential surface of the drum 101. The drum 101 is rotated by any of a number of means, some of which have been described above.

In one embodiment of the present invention, fresh and recycled water 150 is sprayed onto the drum 101 to wet one side of the drum 101 and thus the media 222. By wetting just one side of the drum 101, the media 222 on that side gains mass from absorbed water and the drum 101 is then unbalanced and rotates. Controlling the flow of water 150 over the drum 101 also controls the volume of water 150 pumped from the water-holding channel 103 attached to the frame (support structure) 106 and any water 150 from the settling tank 114 and nutrients from the reservoir 116 that may be needed to maintain the flow and the necessary thickness of biofilms. Controls may by incorporated into the biofilter 100, taking information from sensors 1004 (see FIG. 10) that may be incorporated in selected embodiments of the present invention. The controller 1001 used in embodiments of the present invention is further discussed in describing FIG. 10 below.

FIG. 1 shows a general schematic descriptive of embodiments of the present invention employed as a single open-bed biofilter 100 for contaminated fluid treatment (typically contaminated process air) including odor control. Major components of the second-generation rotating open-bed biofilter 100 include a rotating drum 101 housing media 222 as depicted in FIG. 2, fluid (typically water) sprayers 102A, 102B, an input pipe 108, a hollow center shaft 104 rotatable in bearings 105 and incorporating perforations 325 (FIG. 3) through its outer circumference only under the media 222, a settling tank 114, a reservoir 116 that contains nutrients and a fluid, such as water, for conveying the nutrients, pumps 113, 115, 117 and a fluid (typically sloughed water with some bacteria) collection reservoir 103. In other embodiments, a settling tank 114 may not be needed and a direct line (shown as a dotted-dashed line 140 in FIG. 1) from the pump 113 to the sprayer 102A may be used.

In one embodiment of the present invention, one sprayer 102A distributes recycled water containing nutrients over the drum 101 to both wet the media 222 and rotate the drum 101. In select embodiments of the present invention, a second sprayer 102B supplies water, as necessary, to assist rotation of the drum 101, either using water retaining devices (tabs) 224 (FIG. 2) on the outer surface of the drum 101 or via an appended paddle wheel 130, or the like, as shown in FIG. 1B. The center shaft 104 is supported with ball or needle bearings (not shown separately) or low-friction bearing surfaces 105, such as a TEFLON®-coated bearing, and a support structure 106. In one embodiment of the present invention, the drum 101 comprises multiple media holders 627 affixed to the center shaft 104, each holder 627 incorporating multiple layers of media 222, each layer separated by an air gap 223. Two impermeable end plates 107 insure against leakage at the ends. Contaminated fluid 301, typically process air, is introduced through a fixed inlet pipe 108 to the center shaft 104 by a valve 109. The inlet pipe 108 incorporates one or more ports 110 in its circumference for other applications, such as taking samples, injecting nutrients or controlling humidity and other operating parameters.

In select embodiments of the present invention, the center shaft 104 and inlet pipe 108 may be connected with a suitable "sliding-ring" connector 111 permitting rotation of the center shaft 104. The drum 101 is able to rotate with the center shaft 104, since low friction bearings or sealed lubricated bearing surfaces 105 hold the center shaft 104 to the support frame 106. Used nutrient water (sloughed fluid) is collected in the sump 112 of the water collection reservoir 103 and is pumped via a pump 113 to a settling/filtering tank 114 for solids separation before it is again pumped via a pump 115 to the sprayer 102A. In select embodiments of the present invention, fresh or recycled water is pumped via a pump 117 to the sprayer 102B to assist the sprayer 102A to rotate the drum 101. Two valves 118A, 118B are used to control the combination of water from the fresh water mixing tank 116 in which nutrients are mixed prior to pumping to the sprayer 102A as shown with mixing impeller 216 (FIG. 2), and the settling/filtering water tank 114. Sludge may be periodically discharged from the sump 112 and the settling tank/filter 114 at discharge lines 119 and 120, respectively.

A cross-section through 1-1 in FIG. 1A of the drum 101 is shown in FIG. 2 together with end views of the other elements of an embodiment of the open-bed biofilter 100 of the present invention. The drum 101 consists of a supporting structure 221 for media holders 627, the media 222 and spaces (air gaps) 223 between the layers of media 222. In one embodiment of the present invention, the drum 101 is rotated mainly by gravity due to the weight of fluid (typically water or a mix of water and additives) retained in the media 222. Rotation may be supplemented in select embodiments either by collecting fluid in channels 224 or an appended paddle wheel 130. In select embodiments of the present invention, the sprayer 102A distributes the fluid (typically water) 150 containing nutrients to the media 222. The fluid 150 supplies nutrients to microorganisms in the biofilms and also prevents the media 222 from drying. The sprayer 102A is positioned to supply fluid (typically water) to only half of the surface of the drum 101. As shown in FIG. 2, the sprayer 102A sprays only the top left-half side (12 o'clock to 3 o'clock position) to facilitate rotation of the drum 101. If the weight of the fluid 150 from the first sprayer 102A in the left-half side (12 o'clock to 6 o'clock) of the drum 101 is sufficient to promote a desired rotational speed, no water spray from the second sprayer 102B is needed. However if higher rotational speed is required, e.g., rapid removal of biomass, either the tabs 224 or the appended paddle wheel 130 may be employed with the second sprayer 102B. The purpose of the second sprayer 102B is to supply supplemental fluid (typically water) to the channels 224 or the appended paddle wheel 130, depending on the particular embodiment, to facilitate rotation of the drum 101. In operation, the drum 101 rotates at low speeds, typically less than one ft/sec peripheral velocity.

A cross-section through 2-2 in FIG. 2 of the drum 101 is shown in profile in FIG. 3. For select embodiments of the present invention, arrows 301 show the flow pattern of contaminated fluid (typically process air) as it becomes treated. Contaminated fluid (e.g., a gas such as air) is introduced to the center shaft 104 either from both side ends (as shown only in FIG. 3) or from one end of the center shaft 104 as shown in FIG. 1 at connection 111. Between the two impermeable end plates 107, the center shaft 104 has perforations 325. The contaminated fluid passes through the perforations 325 and is treated by contacting the microbiological film (biofilm). As the contaminated fluid (typically a gas such as air) passes one layer of media 222, it is equalized in the air gap 223 before entering the next layer of media 222. For clarity, only one air gap 223 is shown in FIG. 3, although four air gaps 223 are shown in FIG. 2 for one embodiment of the present invention. After the contaminated fluid (typically a gas such as air) is treated by passing through the biofilms on the media 222, the treated fluid (typically air) exits to the atmosphere (for the open-bed embodiments of the present invention).

Figure 4:
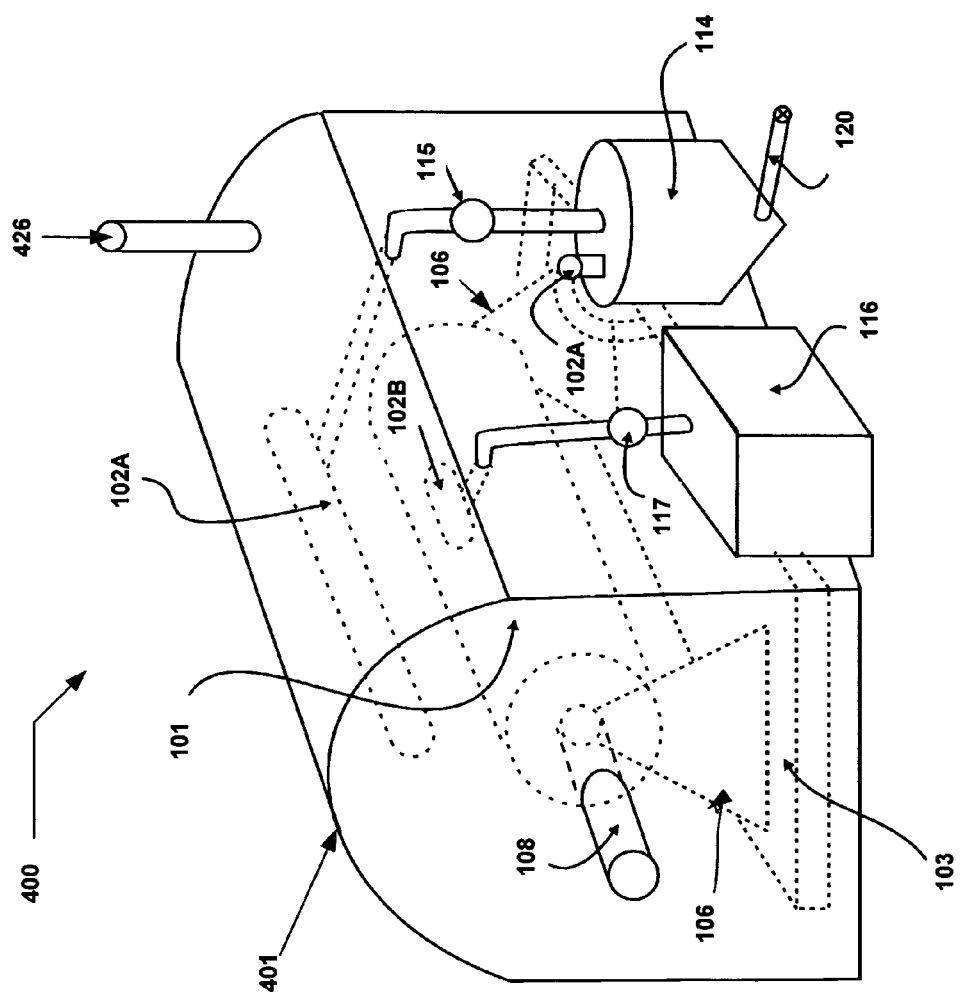
FIG. 4 is a schematic of one class of embodiments of the present invention incorporating a housing to collect emissions.

FIG. 4 depicts an enclosure 401 that may be incorporated in a "housed" embodiment 400 of the present invention, i.e., it does not release treated fluid (typically a gas such as air) to the atmosphere immediately upon treatment. The system 400 incorporates an embodiment of the open-bed biofilter 100 of the present invention. The enclosure 401 may consist of inexpensive airtight material and a support frame (not shown separately) of stainless steel, aluminum, or the like. Construction costs of this housing 401 are much lower than for a reactor container used with a first-generation rotating biofilter, because the housing shown in FIG. 4 contains treated fluid (typically air) and need not be pressurized. Contaminated fluid (typically a gas, such as air) 301 is introduced at the input shaft 108 outside of the enclosure 401 and treated fluid (typically air) is emitted at the outlet 426. Pumps 113, 115, 117 are used to deliver nutrients and water 150 to the media 222 and to rotate the drum 101. The settling/filter reservoir 114 and nutrient-water mixing reservoir 116, together with associated pumps 113, 115, 117 are located outside of the enclosure 401 to reduce the material required to fabricate the enclosure 401 and to provide for ambient air cooling of the pumps 113, 115, 117 and water 150. In select embodiments of the present invention, a capability is provided for reversing flow through the system 400, i.e., to use outlet vent 426 as an inlet and inlet pipe 108 as an outlet.

Figure 5:
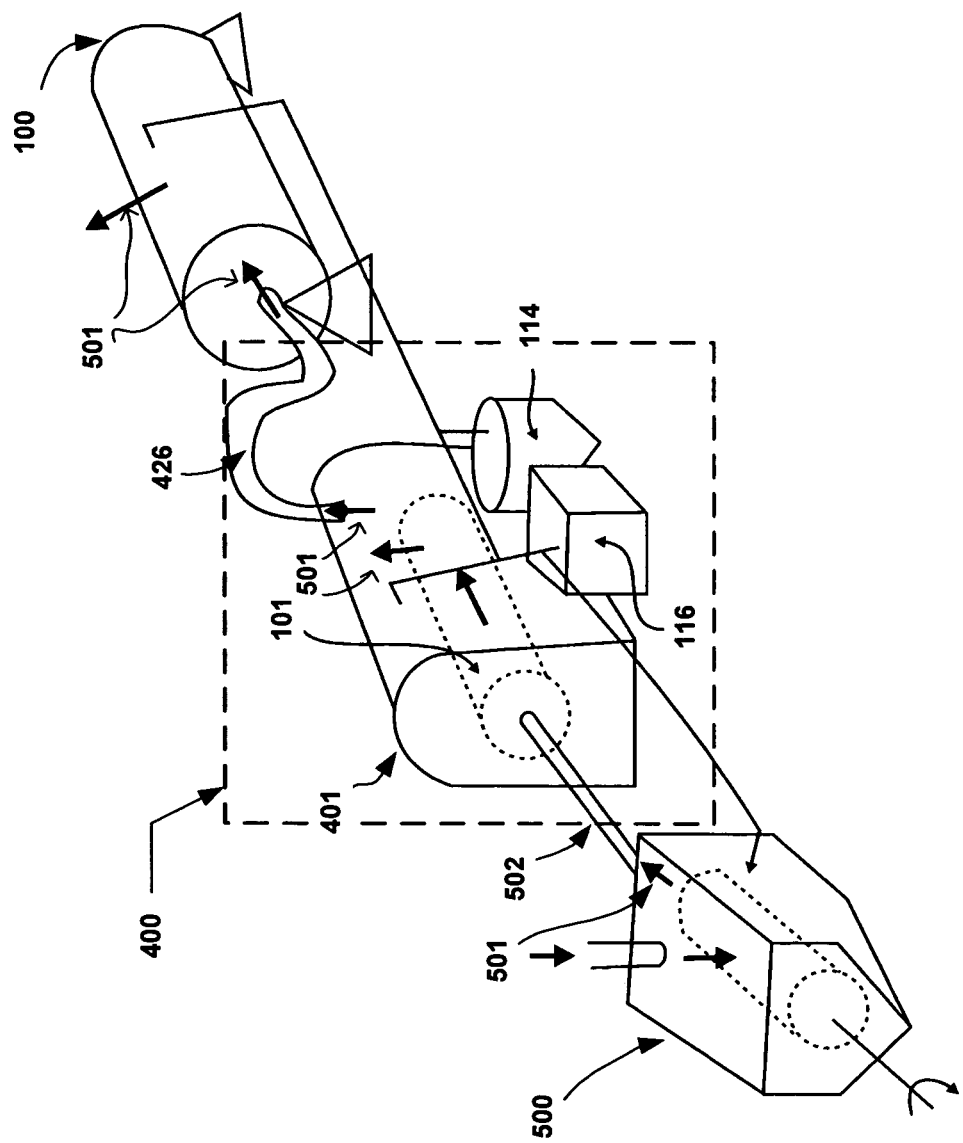
FIG. 5 illustrates an embodiment of the open-bed biofilter of the present invention, a "housed" embodiment of the open-bed biofilter of the present invention and an embodiment of a first-generation rotating biofilter, combined in series operation.

Refer to FIG. 5 depicting a first-generation "closed-bed" biofilter 500, a second-generation "housed" open-bed biofilter 400 such as that of FIG. 4, and a second-generation "open-bed" biofilter 100 such as that of FIG. 1 combined in series. This arrangement demonstrates the flexibility in deploying both open-bed biofilters 100 and "housed" open-bed biofilter systems 400 of the present invention. In such a "daisy-chained" system, a single nutrient-water mixing reservoir 116 and a single water settling/filter reservoir 114 may serve the three different biofilters 100, 400, 500. Arrows 501 show the fluid flow direction. Contaminated fluid (typically a gas such as process air) is introduced to the top of the closed biofilter 500 and treated fluid (typically air) is emitted from the shaft (not shown separately) of the closed biofilter 500. The rotating shaft of the closed biofilter 500 is connected to a fixed conduit or pipe 502. The fixed pipe 502 is again connected to the rotating shaft (not shown separately in FIG. 5 but 104 in FIGS. 1 and 3) of the enclosed biofilter 400. Partially treated fluid (typically a gas such as process air) is emitted at the vent conduit or pipe 426 of the enclosure 401. The vent pipe 426 is connected to the center shaft (not shown separately in FIG. 5 but 104 in FIGS. 1 and 3) of the open-bed biofilter 100. The resultant treated fluid (typically air) is emitted to the atmosphere after passing through the three separate treatment schemes 100, 400, 500.

Refer to FIG. 6. In one embodiment of the present invention media 222 and air gaps 223 are fabricated in cartridges 627 to be fitted into media holders 629 to comprise full "baskets" 628. For an octagonal drum 601 as shown in FIG. 6, eight filled compartmentalized baskets 628 are used. The octagonal drum 601 consists of a center shaft 104 with perforations 325 (FIG. 3), end plates 107, support structure 221 and basket 628. Each basket 628 contains a cartridge 627 that is filled with media 222 contained in a media holder 629.

Figure 7:
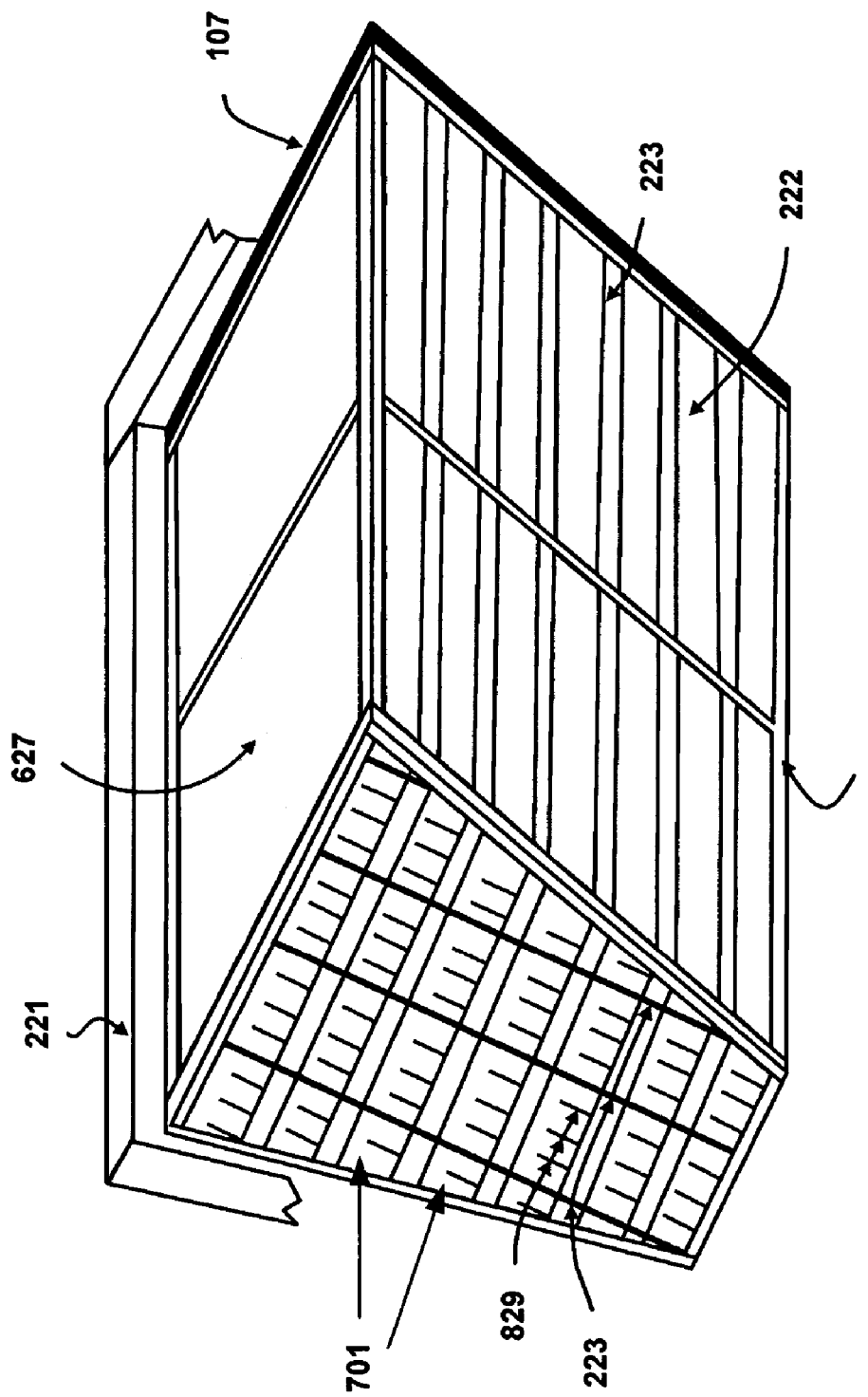
FIG. 7 illustrates a support structure for one segment used with the configuration of FIG. 6.

FIG. 7 shows support structure 221, a single cartridge 627 filled with media 222 and the incorporated air gaps 223 as fabricated to comprise a full basket 628. A single cartridge 627 may be supported via the support structure 221 and both end plates 107 (FIG. 6). The cartridge 627 consists of the media 222 internally supported by media holders 629, with parts 829, 837 of media holders 629 further depicted in FIG. 8. These media holders 629 are constructed of suitable material, such as plastic or stainless steel, and the air gaps 223 are maintained with spacers 830 (FIG. 8) that are also constructed of suitable material, such as plastic or stainless steel.

Figure 8:
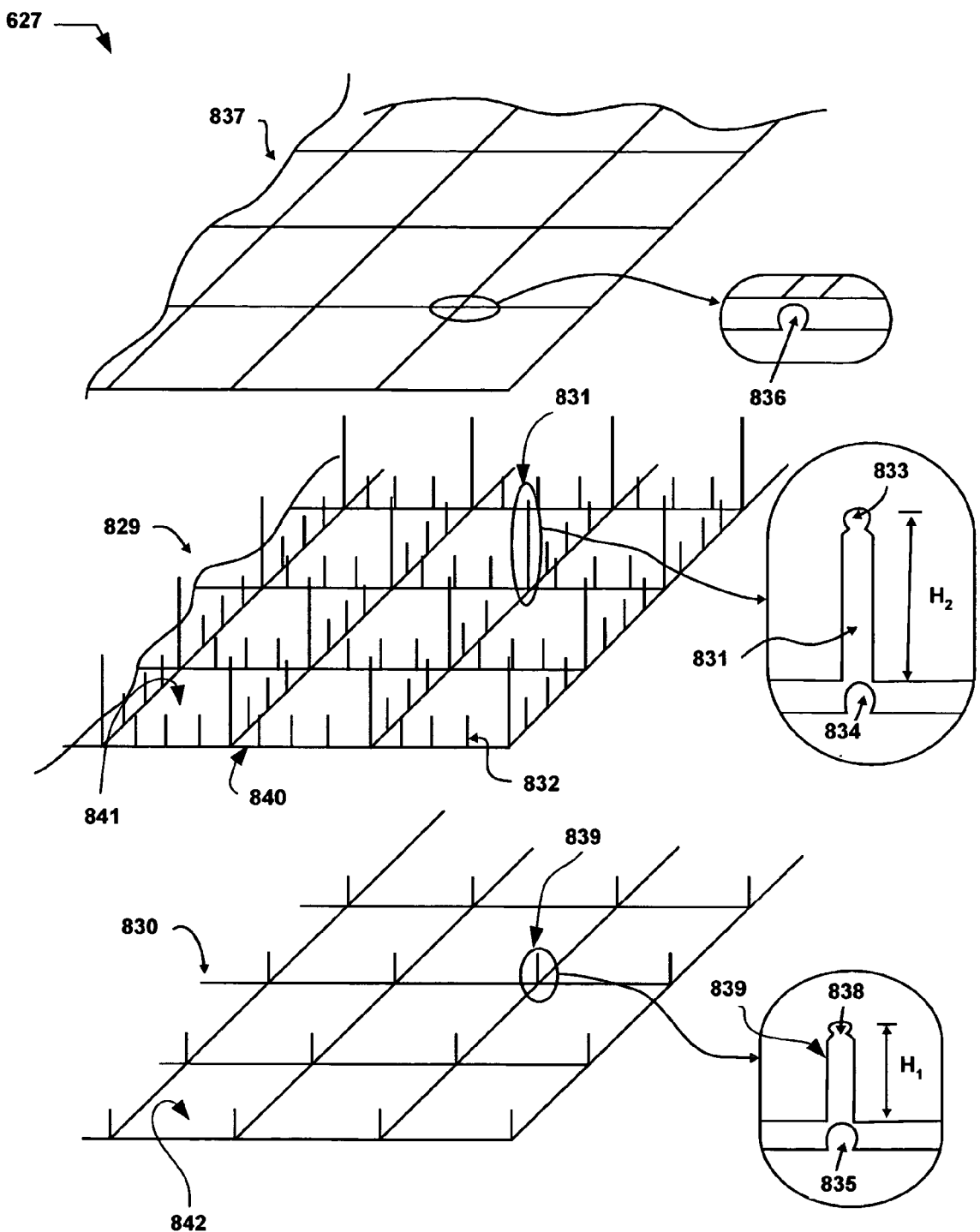
FIG. 8 illustrates components of a single media section that may be incorporated in the segment of FIG. 7.

FIG. 8 depicts selected individual components of an embodiment of the cartridge 627 including the media holder 829 serving as internal structure support for the media 222 and a spacer 830 for maintaining the air gap 223. An embodiment of the media holder 829 employs a grid 840 having square sections 841 incorporating long 831 and short 832 pins installed perpendicular to the grid 840. In one embodiment of the grid, the sections 841 may be approximately 5 cm on a side (2×2 in.) with the long pins 831 of height $H_2$ being approximately 3.8 cm (1.5 in.) long and the short pins 832 of height $H_1$ (similar to the pins used for the air gap spacer 830) being approximately 1.3 cm (0.5 in.) long. The short pins 832 provide support to hold media 222 in along the edge of each grid section 841 while the long pins 831 define the thickness of media 222 that may be used. In one embodiment of the present invention, one end of a long pin 831 is fixed on the corner of each grid section 841 via a suitable locking structure, such as a ball 833 and socket 834. Using a long pin 831 of 3.8 cm (1.5 in.) enables media of approximately 3.8 cm (1.5 in.) to be used. In embodiments using multiple layers of media 222 in the cartridge 627 as shown in FIG. 7 and a ball 833 and socket 834 arrangement for securing long pins 831 to the grid 840, the ball 833 on the long pin 831 is locked with the socket 835 of the spacer 830 for internal layers of media 222. The ball 833 on the long pin 831 is locked with the socket 836 incorporated in the retainer grids 837 (having no pins) for the innermost and outermost layers of media 222. The air gap spacer 830 used with the above embodiment incorporates grid sections 842 approximately 5 cm on a side (2×2 in.) and corner pins 839 approximately 1.3 cm (0.5 in.) high to connect with the grid sections 841 of the media holder 829 for maintaining an appropriate air gap 223. One end of each corner pin 839 of the air gap spacer 830 is fixed on the grid section 842 and the other end of the corner pin 839 has a ball 838 that is connected to the appropriate socket 834 incorporated in the corner of each grid section 841 of the media holder 829 for media holders 829 attached above the air gap spacer 830. For media holders 829 attached below the air gap spacer 830, the reverse occurs with the ball 833 of each long pin 831 fitting into the socket 835 of the corresponding corner of the grid section 842 of the air gap spacer 830. The above describes but one embodiment for attaching multiple layers of media 222 while assuring appropriate air gaps 223 between them. One skilled in the art can appreciate a number of ways that an air gap 223 may be maintained between multiple layers of media 222 in an appropriate rotating fixture such as the drum 101 described above, all of which fall within the ainbit of the present invention. For example, the media 222 may be incorporated in media holders 829 made of plastic but replaceable in slots between stainless steel spacers (not shown separately) of a stainless steel frame (not shown separately) that maintains the requisite air gaps 223. These media holders 829 may just slide into the stainless steel frames or snap into place and be held by spring stainless steel connectors (not shown separately).

FIG. 9 shows two "trapezoidal chunks" of media 222 as may be representative of two media sections (or layers) 701, seven of which are represented in profile in FIG. 7. The layers 701 of media 222 represented in FIG. 9 are two "middle internal" layers, i.e., they are neither the innermost layer nor the outermost. Note that the two sections 701 are separated by an air gap 223 and, since they are middle internal layers 701, are also bounded on their respective sides that are parallel to the depicted air gap 223 of FIG. 9 by air gaps 223. Contaminated air, as shown by the arrow 301, flows axially in from the input conduit or pipe 104 (FIG. 1) and radially out from the input pipe 104 to the layers 701 of media 222, escaping to the atmosphere upon exiting the outermost layer 701. Note that surfaces abcd 901, efgh 902, jklm 903, and nopq 904 are immediately adjacent air gaps 223. Although a biofilm may be present at the surfaces abcd 901, efgh 902, jklm 903, and nopq 904, biofilms exist throughout the depth of the media 222, such that embodiments of the present invention may be termed "full-depth" filters. After the contaminated air passes through a section 701 of media 222, the air gap 223 serves to equalize pressure before the air again enters a next section 701 of media 222. In the embodiment shown in FIGS. 2, 7 and 9, using "trapezoidal chunks" as sections 701 the volume of media increases as the air passes through each until it passes through the largest volume section 701 on the outer surface of the drum 101. This provides more biofilm area at the outer sections 701 to "polish" the air of residual contanination before release to the atmosphere. The outer sections 701 are also those sections exposed directly to moisture from the sprayers 102A and 102B. This enables them to be easily sloughed of excess biomass on the biofilms, if any.

Figure 10:
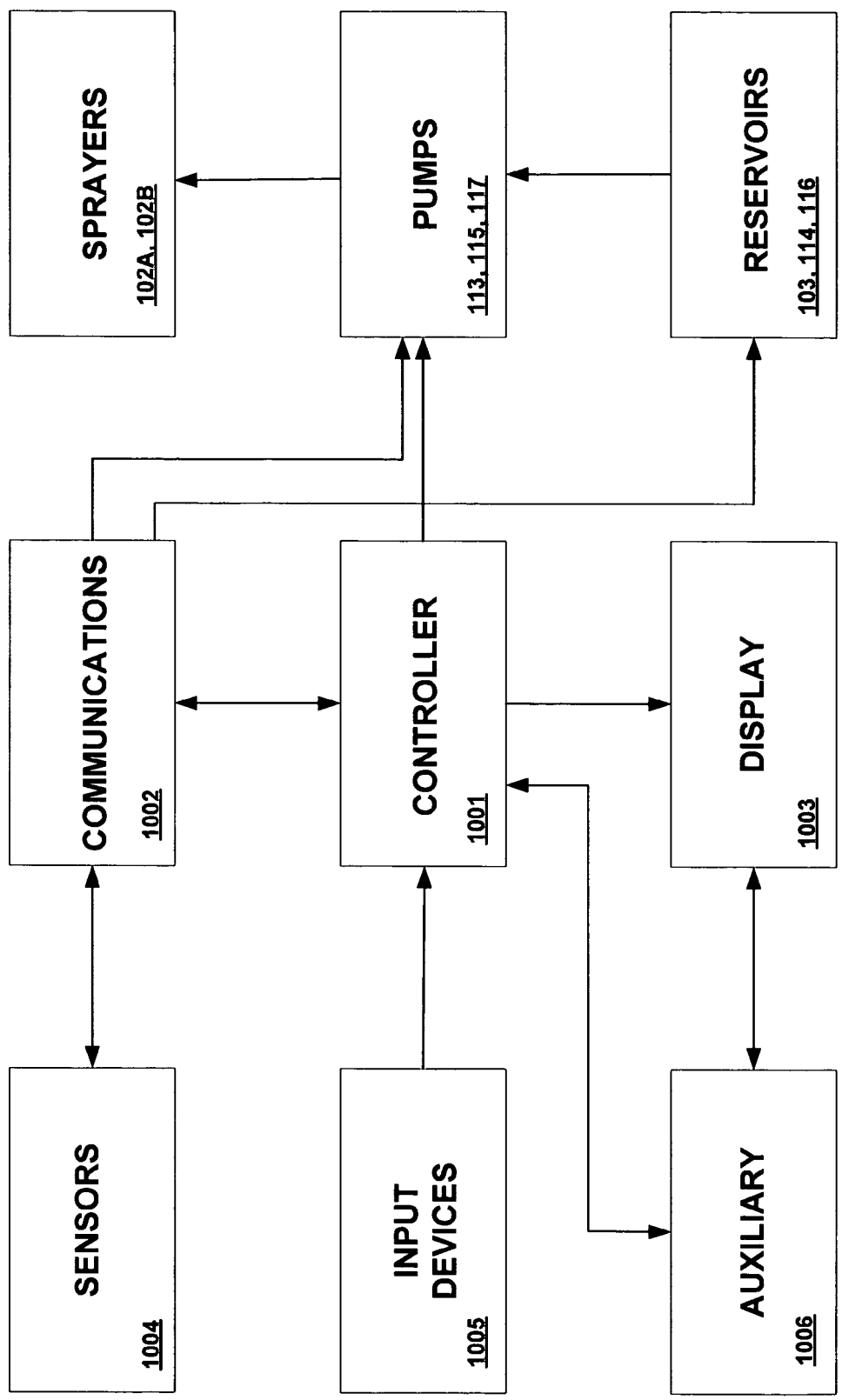
FIG. 10 is a block diagram of a control system that may be used with embodiments of the present invention.

Refer to FIG. 10. An embodiment of the present invention may be controlled for automatic or semi-automatic operation using a controller 1001 that may be a general purpose computer, an application specific integrated circuit, or the like. The controller 1001 may be accessed by a number of input devices 1005 such as a keyboard, a mouse, remote control devices, an intranet connection, an internet connection, and the like. Associated with the controller 1001 may be one or more displays 1003 such as a CRT, an LCD, LEDs, speakers, warning lights, and the like. The system may also incorporate communications 1002 that permit the controller 1001 access to both human operators and sensors 1004 such as pH sensors, thermometers, rotational speed monitors, thermocouples, pressure and airflow detectors, and the like. The communications may occur through the controller 1001 or be done in an override mode with select components such as the pumps 113, 115, 117, reservoirs 103, 114, 116 and sensors 1004. The sprayers 102A, 102B are actuated only by the pumps 113, 115, 117 so control of the pumps 113, 115, 117 controls them. Also provided may be auxiliary devices 1006 such as heat exchangers, air dryers, tanks for additives, such as chemicals, to condition the contaminated fluid (typically a gas such as process air) or the fluid (typically water) used to wet the media 222, and hand held remote controls for querying multiple displays 1003, for remotely actuating or querying the controller 1001, and for manual bypass, testing, or safety mechanism operation, and the like.

In one embodiment of the present invention, the contaminated fluid (typically a gas such as process air) may be mixed with a liquid or vapor inserted via pumps 115, 117 (as shown by dotted lines 145) at the access port 110 representing one access port of a number of possible access ports, shown in FIG. 1 as just one port for illustrative purposes only. The liquid or vapor may contain water only, nutrients, or both as needed for maintenance of the microorganisms in the biofilm. By supplementing at the access port 110, the flow of the contaminated fluid (typically a gas such as process air) itself carries necessary moisture or supplemental nutrients, as needed, to maintain the biofilms, especially on the innermost layers 701 of media 222. Since the movement of the supplemental materials, e.g., nutrients in humidified air, is not counter to the flow of the contaminated fluid (typically a gas such as process air), any drying effect that may preclude fully "moisturizing" the inner layers 701 of an embodiment of the open-bed biofilter 100 of the present invention is overcome.

Embodiments of the present invention may treat a wide array of odors and biodegradable gaseous contaminants including, but not limited to:

| TYPES | EXAMPLES |
| --- | --- |
| Aliphatic Hydrocarbons | Hexane |
| Aromatic Hydrocarbon | Benzene, Phenol, Toluene, Xylene, Styrene, Ethylbenzene |
| Chlorinated Hydrocarbon | Dichloromethane |
| Nitrogen-Containing Carbon Compounds | Amines, Aniline |
| Sulfur-Containing Carbon Compounds | Carbon Bisulfide, Dimethyl Sulfide, Dimethyl Disulfide |
| Alcohols | Methanol, Ethanol, Butanol, Propanol |
| Aldehydes | Formaldehyde, Acetaldehyde, |
| Carbonic Acids | Butyric Acid, Vinyl Acetate, Ethyl Acetate, Butyl Acetate, Isobutyl Acetate |
| Ethers | Diethyl Ether |
| Ketones | Acetone, Methyl Ethyl Ketone |
| Nitro Ester | Nitroglycerin (Energetics) |
| Inorganic | Ammonia, Hydrogen Sulfide |
| Aerosols & Particulates | Biodegradable Organics |

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract of the disclosure is provided to comply with the rules requiring an abstract, which will allow a searcher to quickly ascertain the subject mailer of the technical disclosure of any patent issued from this disclosure. 37 CFR § 1.72(b). Any advantages and benefits described may not apply to all embodiments of the invention.

I claim:

1. An apparatus comprising:
   at least one means for containing media;
   at least one first conduit for conveying contaminated fluid, said first conduit perforated so as to permit distributing contaminated fluid through said media;
   porous media in operable communication with said means for containing and said first conduit:
   at least one type of microorganism,
   wherein within the pores of said media at least one microbiological film is cultivated from said microorganisms;
   at least one means for maintaining said microbiological film; and
   at least one means for rotating said media at least partly via a fluid;
   wherein said apparatus degrades at least a portion of contaminants in said contaminated fluid.

2. The apparatus of claim 1 further comprising at least one second conduit in operable communication with said first conduit, said second conduit further permitting access to said contaminated fluid while said apparatus is in operation.

3. The apparatus of claim 1 in which said media comprises at least one foam having pores.

4. The apparatus of claim 3 in which said foam is formed to accommodate pore size in the range of about 0.5–5.0 mm (0.02–0.2 in) and distribution of said pores in the range of about 2–20 pores/cm (5–50 pores/in) of surface of said foam in all possible dimensions, including a slice taken through the center of a section of said foam.

5. The apparatus of claim 4 in which said foam comprises hydrophobic material preferably having a hydrophilic surface adjacent said pores, wherein said foam is free of fire retardant and biocide, and wherein said surface is conducive to growth of a microbiological film thereon.

6. The apparatus of claim 1 in which said means for rotating and
   said means for maintaining said microbiological film, at least in part comprise:
   at least one fluid dispenser;
   at least one pump in operable communication with at least said dispensers,
   wherein said pumps provide a fluid to media on one side of said apparatus to increase the weight of said media on said side and facilitate rotation of all said media;
   at least one first reservoir in operable communication with at least one of said pumps,
   wherein said fluid may contain nutrients;
   at least one second reservoir for collecting residue from operation of said fluid dispensers, said second reservoirs in operable communication with at least one of said pumps; and
   a fixed structure in operable communication with said first conduit and incorporating at least one bearing surface to facilitate rotation of said first conduit with said media.

7. The apparatus of claim 6 further comprising at least one fluid retention mechanism affixed to said media containing means and in operable communication with at least one said dispensers to accumulate said fluid for facilitating rotation of said media.

8. The apparatus of claim 7 in which said retention mechanisms are incorporated as at least one channel on an outermost surface of said means for containing said media.

9. The apparatus of claim 6 in which said retention mechanisms are incorporated as at least one paddle wheel in operable communication with said media.

10. The apparatus of claim 6 in which said fluid dispensers are sprayers.

11. The apparatus of claim 6 in which at least one said reservoir further comprises at least one settling tank in operable communication with said second reservoirs and at least one said dispenser via at least one of said pumps.

12. The apparatus of claim 1 in which said means for containing media provides for arranging said media around at least part of said first conduit in at least two sections, said sections separated by an air gap maintained by structure in said means for containing media.

13. A system comprising:
   at least one means for containing media;
   at least one first conduit perforated so as to permit distributing contaminated fluid through said media;
   porous media in operable communication with said means for containing and said first conduit,
   at least one type of microorganism:
   wherein upon said media at least one microbiological film comprising said microorganisms is cultivated and maintained;
   at least one means for maintaining said microbiological film;
   at least one means for rotating said media at least partly via a fluid; and
   at least one means for controlling said means for rotating and said means for maintaining,
   wherein said system degrades at least a portion of contaminants in said contaminated fluid.

14. The system of claim 13 further comprising at least one second conduit in operable communication with said first conduit, said second conduit further permitting access to at least said contaminated fluid while said system is in operation.

15. The system of claim 13 in which said media comprises at least one foam having pores.

16. The system of claim 15 in which said foam is formed to accommodate pore size in the range of about 0.5–5.0 mm (0.02–0.2 in) and distribution of said pores in the range of about 2–20 pores/cm (5–50 pores/in) of surface of said foam in all possible dimensions, including a slice taken through the center of a section of said foam.

17. The system of claim 15 in which said foam comprises hydrophobic material preferably having a hydrophilic surface immediately adjacent said pores, wherein said foam is free of fire retardant and biocide, and wherein said surface is conducive to growth of a microbiological film thereon.

18. The system of claim 13 in which said means for rotating and
   said means for maintaining said microbiological film, at least in part comprise:
   at least one first fluid dispenser;
   at least one pump in operable communication with at least said dispensers;
   wherein said pumps provide a fluid to media on one side of said apparatus to increase the weight of said media on said side and facilitate rotation of all said media;
   at least one first reservoir in operable communication with at least one of said pumps,
   wherein said fluid may contain nutrients;

at least one second reservoir for collecting residue from operation of said dispensers, said second reservoirs in operable communication with at least one of said pumps; and
a fixed structure in operable communication with said first conduit and incorporating at least one bearing surface to facilitate rotation of said first conduit with said media.

19. The system of claim 18 further comprising at least one fluid retention mechanism in operable communication with said means for containing said media and in operable communication with at least one said dispensers to accumulate said fluid for facilitating rotation of said media.

20. The system of claim 19 in which said retention mechanisms are incorporated as at least one channel on an outermost surface of said means for containing said media.

21. The system of claim 19 in which said retention mechanisms are incorporated as at least one paddle wheel in operable communication with said media.

22. The system of claim 18 in which said fluid dispensers are sprayers.

23. The system of claim 18 in which at least one said reservoir further comprises at least one settling tank in operable communication with said second reservoirs and at least one said dispensers via at least one of said pumps.

24. The system of claim 13 in which said means for containing media provides for arranging said media around at least part of said first conduit in at least two sections, said sections separated by an air gap maintained by structure in said means for containing media.

25. The system of claim 13 in which said means for controlling comprises manually observing operation of said system and manually adjusting operation of components of said system.

26. The system of claim 13 in which said means for controlling further includes an automated control capability, at least in part comprising:
at least one sensor;
at least one connection pathway in operable communication with said sensor; and
at least one controller in operable communication with said sensor via said connection pathway.

27. The system of claim 26 in which said controller is selected from the group consisting of: a personal computer, a general purpose computer, a laptop computer, an application specific integrated circuit (ASIC), and combinations thereof, wherein said controller controls at least rotational speed of said media, temperature of operation of said system, pH of said fluids, pressure of said contaminated fluid within said media, retention time of said contaminated fluid within said media, flow rate of said fluids, and integrity of said microbiological film.

28. The system of claim 26 in which said controller further comprises:
at least one input apparatus;
at least one communications mechanism,
wherein said communications mechanism at least serves to alert to anomalous operation of said system; and
at least one display.

29. The system of claim 13 in which said means for maintaining
said microbiological film, further comprises at least in part at least one access way to said first conduit.

30. A method for treating contaminated fluid, comprising:
providing porous media in layered sections separated by air gaps for attachment to a perforated pipe, said sections arranged to form a multi-sided smoothly contiguous configuration about said pipe;
rotating said pipe with said media affixed thereto and wetting said media via flow of a first fluid over one side of said configuration,
wherein the weight of said first fluid upon said media on one side of said configuration facilitates rotation of said pipe;
providing at least one type of microorganism to establish at least one microbiological film on said media;
maintaining a contaminant-abating effective level of said microbiological film on said media;
passing said contaminated fluid from said perforated pipe through said media for a pre-specified retention period of said contaminated fluid in said media; and
catching portions of said first fluid sloughed from said configuration after wetting said media, and
recycling said sloughed fluid,
wherein said method removes at least some contaminants from said contaminated fluid, and
wherein said method removes at least some odor from said contaminated fluid that is odiferous, and
wherein said method removes at least some volatile organic compounds (VOCs) from said contaminated fluid that contains VOCs.

31. The method of claim 30 in which said contaminated fluid is a gas and said first fluid is a liquid.

32. The method of claim 31 in which said gas is air and said liquid is water.

33. The method of claim 30 further providing at least one fluid retention mechanism on the surface of said configuration.

34. The method of claim 30 further providing at least one paddle wheel in operable communication with said media.

35. The method of claim 30 further comprising providing nutrients to said microorganisms,
wherein said nutrients facilitate maintaining said microbiological film.

36. The method of claim 30 further comprising settling said sloughed fluid, said settling accomplished prior to said recycling.

37. The method of claim 30 further comprising mixing at least one second fluid with said contaminated fluid prior to introduction of said contaminated fluid to said media.

38. The method of claim 30 further comprising providing at least one control system for implementing control of said method.

39. The method of claim 38 further comprising integrating said control systems into at least one emission control system of a facility.

40. An apparatus for treating contaminated fluid comprising:
at least one type of microorganism;
porous media having pores of a pre-specified pore size, wherein upon said media at least one microbiological film is established from said microorganisms;
at least one conduit for conveying at least said contaminated fluid;
at least one container for retaining said media and affixing said media to said conduit;
at least one mechanism for supporting said conduit, said mechanism permitting rotation of said conduit;
at least one fluid dispenser for facilitating rotation of said media and facilitating maintenance of said microbiological films,
wherein said fluid may contain nutrients;
at least one pump in operable communication with at least said dispensers;

at least one first reservoir in operable communication with at least one of said pumps; and at least one second reservoir for collecting residue from operation of said fluid dispensers, said second reservoirs in operable communication with at least one of said pumps, wherein said apparatus removes at least a portion of contaminants in said contaminated fluid.

41. The apparatus of claim 40 in which said conduit is at least one first pipe perforated so as to permit distributing at least said contaminated fluid through said media.

42. The apparatus of claim 40 further comprising at least one fluid retention device in operable communication with said container for facilitating rotation of said media.

43. The apparatus of claim 42 in which said retention devices are incorporated as at least one channel on an outermost surface of said containers.

44. The apparatus of claim 42 in which said retention device comprises at least one paddle wheel.

45. The apparatus of claim 41 further comprising at least one second pipe in operable communication with said first pipe, said second pipe further permitting at least access to said contaminated fluid while said apparatus is in operation.

46. The apparatus of claim 40 in which said pre-specified pore size is in the range of about 0.5–5.0 mm (0.02–0.2 in) and distribution of said pores in the range of about 2–20 pores/cm (5–50 pores/in) of surface of said media in all possible dimensions, including a slice taken through the center of a section of said media.

47. The apparatus of claim 40 in which said media comprises at least one foam.

48. The apparatus of claim 47 in which said foam comprises hydrophobic material preferably having a hydrophilic surface adjacent said pores, wherein said foam is free of tire retardant and biocide, and wherein said surface is conducive to growth of a microbiological film thereon.

49. The apparatus of claim 40 in which said first fluid dispensers are sprayers.

50. The apparatus of claim 40 in which at least one said reservoir further comprises at least one settling tank in operable communication with said second reservoirs and at least one said dispenser via at least one of said pumps.

51. The apparatus of claim 40 in which said containers provide for arranging said media around at least part of said conduit in at least two sections, said sections separated by an air gap maintained by structure in said container.

* * * * *